A. G. CUMMINGS.
LAND AND WATER BOAT.
APPLICATION FILED DEC. 18, 1908.
919,829.
Patented Apr. 27, 1909.
3 SHEETS—SHEET 3.
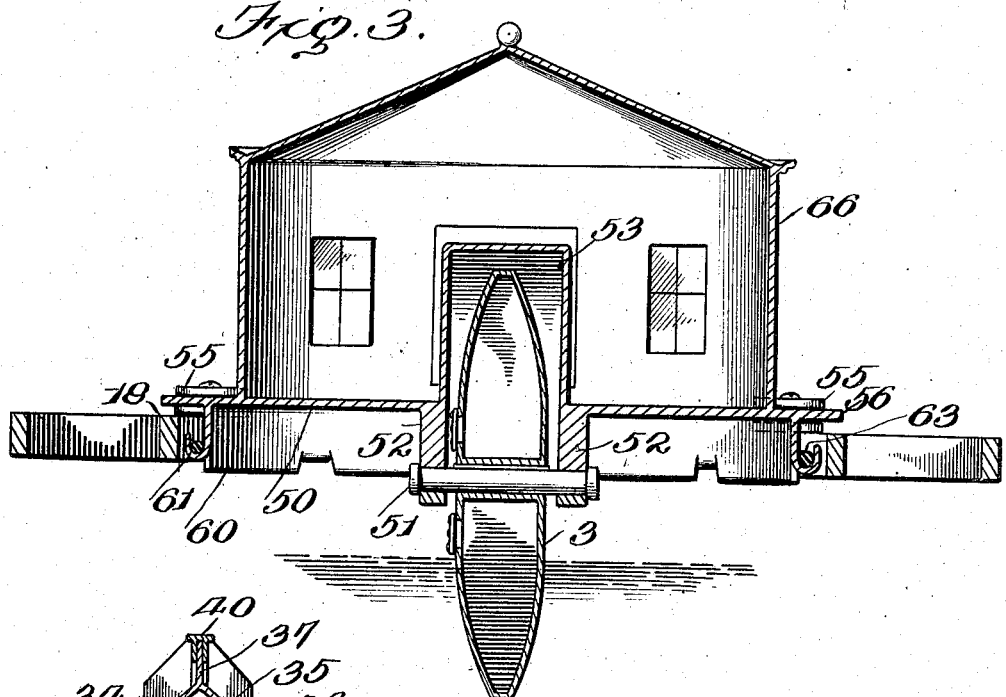
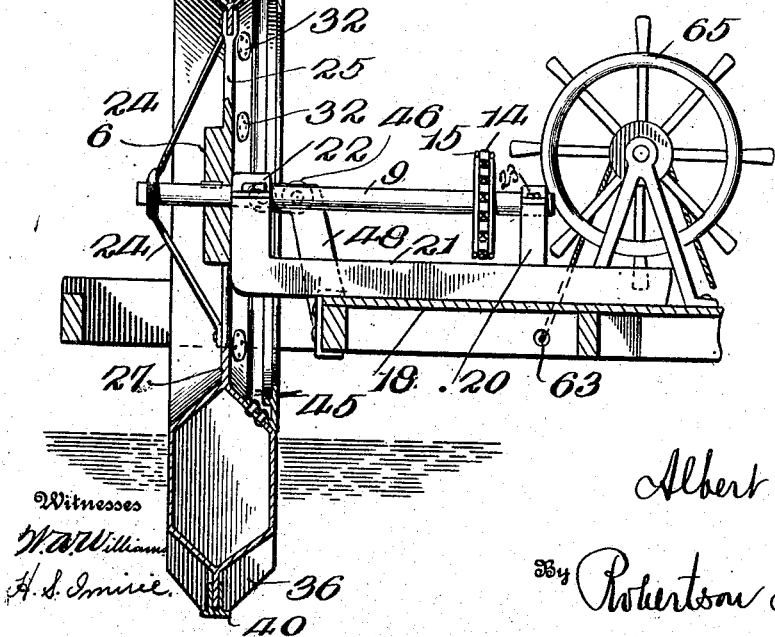

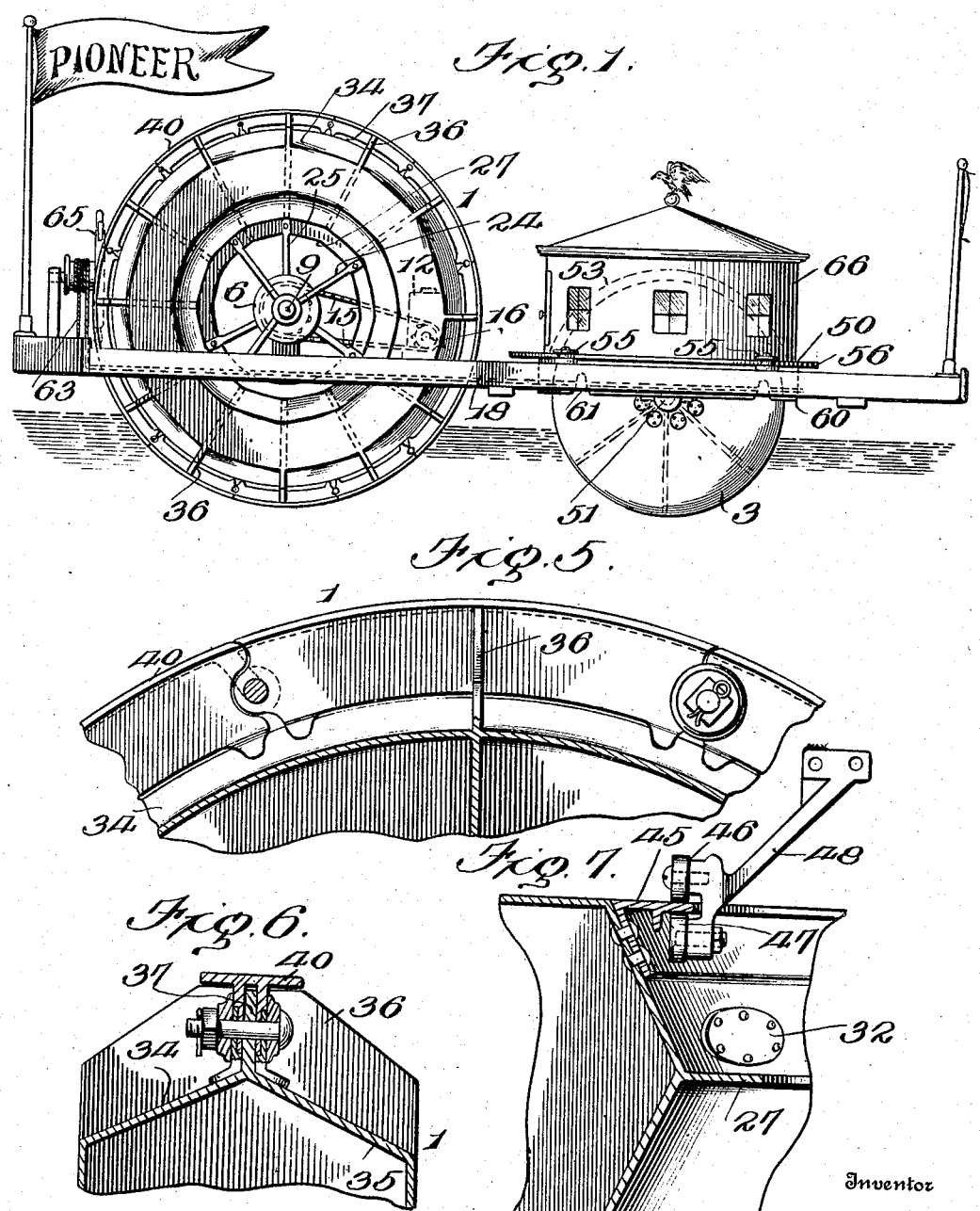

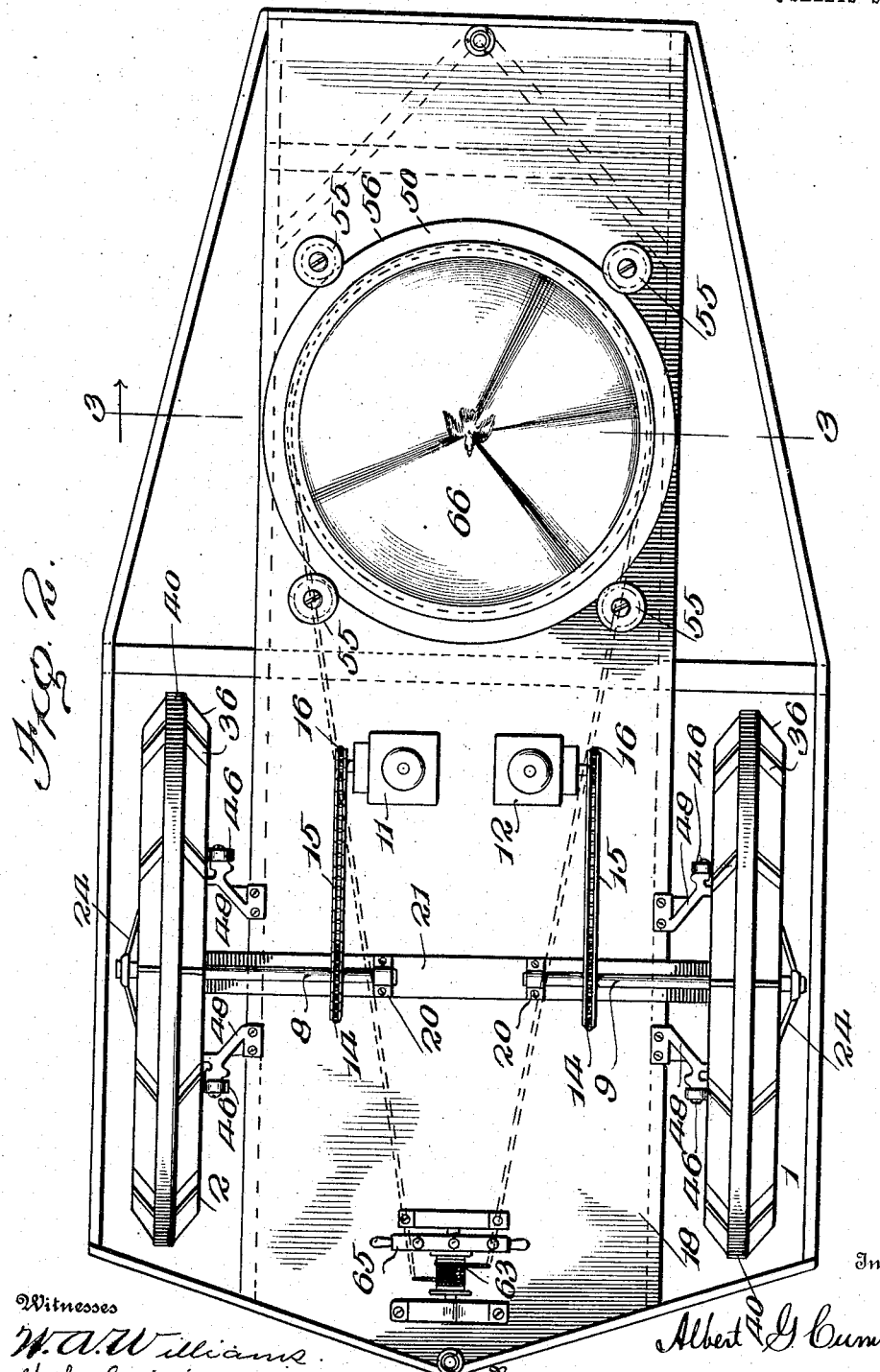

UNITED STATES PATENT OFFICE.

ALBERT G. CUMMINGS, OF UPPER PAXTON TOWNSHIP, DAUPHIN COUNTY, PENNSYLVANIA.

LAND AND WATER BOAT.

No. 919,829.  Specification of Letters Patent.  Patented April 27, 1909.

Application filed December 18, 1908. Serial No. 468,190.

*To all whom it may concern:*

Be it known that I, ALBERT G. CUMMINGS, a citizen of the United States, and a resident of Upper Paxton township, county of Dauphin, and State of Pennsylvania, have invented certain new and useful Improvements in Land and Water Boats, of which the following is a specification.

This invention relates to improvements in land and water boats and the object of the invention is to provide a boat in which the main or driving shaft or shafts are so located that the center of gravity is somewhat below said driving shaft or shafts and that the bearings for these shafts are so disposed that they carry the weight near the center of the main wheels, i. e., the bearings for the shafts are adjacent the hubs of the wheels, and said hubs are preferably a little to one side of the center of the wheels so that the hubs and said bearings contact at a line drawn substantially through the center of the wheels.

Another point is to use large sized wheels which provide an excess of buoyancy, facilitate speed, and also permit access to water tight compartments therein. Another feature of the wheels is that a web is formed outside of the water tight compartments which is rather extended in depth so as to protect the shell of said water tight compartments and also serve to prevent the said compartments from receiving serious injury or puncture by impact with rocks when the boat is used in shallow water.

Other points will be hereinafter more fully described.

In the drawings accompanying and forming part hereof, Figure 1 is a side elevation of a boat constructed in accordance with my invention. Fig. 2 is top plan view of the same. Fig. 3 is a transverse section through the rudder wheel and its turn table. Fig. 4 is a transverse section of one of the main wheels, its axle, etc. Fig. 5 is a detail showing part of the periphery of one of the large wheels. Fig. 6 is a section of the tread of the wheels. Fig. 7 is a sectional detail showing an auxiliary support for the wheels.

Referring now to the details of the drawings by numerals: 1 and 2 represent the main or driving wheels and 3 the smaller or rudder wheel, the wheels 1 and 2 being preferably arranged at opposite sides at the front of the boat and the smaller or rudder wheel at the rear of the boat, and in actual construction I prefer that the parts shall be so arranged and organized that the two larger wheels shall each sustain 40% of the load while the rudder wheel shall sustain 20% of the load; thus the load is divided into five parts, one part on the rudder wheel and two parts on each of the main or driving wheels.

The main or driving wheels are formed of peculiar construction and I prefer to describe the rest of the structure before describing the details of these wheels. For the present it is only necessary to state that they are provided with hubs 6 which are keyed to and driven from shafts 8 and 9. These shafts may be driven in any desirable way and if desired they may be connected together by clutches although I prefer the form shown in the drawings in which each shaft is driven from independent motors or engines 11 and 12 which are shown merely in conventional form in Fig. 2. As shown in said figure the two shafts 8 and 9 are each provided with a sprocket wheel 14 and these sprocket wheels are connected by chains 15 with other sprocket wheels 16 on the engines or motors 11 and 12 but as stated any other construction may replace these, although I prefer them for the reason that the driving wheels may thus be independently driven and in the event that it is necessary to turn rapidly one wheel may be driven in one direction while the other may be driven in the opposite direction.

The platform or deck of my boat is designated by the numeral 18 and by inspection of Figs. 1 and 4 it will be observed that this deck is below the driving shafts 8 and 9 so that the center of gravity is somewhat below said shafts. It will also be observed that the platform or deck 18 is hung from said shafts and is supported on the shafts by means of uprights 20 extending from a transverse beam 21 having bearings 22 and 23 at their upper ends. It will be observed that the bearing 22 is within the center of the driving wheels and I deem this a feature of considerable importance since the strain or leverage on the driving shaft is therefore practically at the center of the wheels whereby the strain on the axles is reduced to a minimum. To this end, the hubs 6 of the driving wheels are located slightly to one side of the center of said wheels so that the said hubs and the bearings 22 contact substantially in a line drawn through the center of said wheels; thus the leverage on said driving shafts amounts to practically nothing. Each of the main shafts or axles 8 and 9 also extends through the hub 6 and its end is further connected by diagonal stay braces 24 which assist the spokes 25 in properly supporting the main or driving wheels 1 and 2. These stay braces however do not relieve the main driving shafts of the strain since the leverage is between the point where the shafts are supported by the bearings 22 and the hub 6 and as these bearings 22 and hub 6 are substantially in the center of the wheel, as before stated, the leverage at this point is reduced to a negligible quantity.

The spokes 25 which have just been referred to are connected to webs or flanges 27 projecting inwardly from the wheels 1 and 2 and beyond this point the wheels are provided with a series of water tight compartments extending all round the wheel and forming the major part thereof, these compartments being shown in Fig. 4 as radially disposed and are also indicated in dotted lines in Fig. 1. In the form shown in Fig. 4 these water tight compartments are preferably six-sided and the inner angular side 30 (as indicated in Fig. 4) of each compartment is provided with a man-hole plate 32 to provide access to each compartment. It will be noticed that these man-hole plates all face the interior of the wheel and are so located that they may be accessible from the deck or platform in case any attention is necessary in the event of leaks, punctures or dents. These water tight compartments are also provided with angular peripheries as indicated at 34 and 35 and the compartments join each other so that they form a practically continuous periphery around the outside of the wheel and I prefer to form the angular peripheries 34 and 35 on the angle shown in Fig. 4 for reasons to be explained. Projecting from the apex of the angular peripheries 34 and 35 is a web 37 which extends around the entire wheel and I prefer to form this web of considerable depth so that when the boat is in rather shallow water the web serves as a means of protecting the water tight compartments from serious damage or puncture should the wheel come in contact with any rocks. Furthermore, another advantage accrues from the use of the slanting sides 34 and 35 in that should the wheels strike against any rocks the slanting sides will make it possible for the wheels to slide off of the rocks and thus prevent any damage. Blades 36 are also provided projecting radially and laterally and these act not only to prevent the slipping of the wheels in the water, but also as a strengthening means connecting the webs 37 and the outer shell of the water tight compartments. The water tight compartments may also be braced laterally as shown in dotted lines in Fig. 1. The web 27 as shown in Figs. 4, 5 and 6 is also provided with an annular tread 40 which as indicated in Fig. 5 is preferably made in sections and bolted to the web 37. This provides a structure which makes the wheels especially adapted for use on shore when it is necessary and owing to the fact that the treads are formed in section, they may be easily removed for sea going purposes. In order to further support the wheels and relieve the main or driving shafts of what slight leverage there may be thrown upon them, I also provide on the interior of the driving wheels an inwardly projecting flange 45. As will be seen in Fig. 4 this flange is annular and projects entirely around the wheel and as illustrated in Fig. 7 this flange coacts with two anti-friction rollers 46 and 47 which are supported upon a bracket 48 projecting from the deck or platform as illustrated in Fig. 2. This construction relieves the axle of considerable strain although it is not absolutely necessary when the bearings for the driving shafts are formed directly next to the hub illustrated in Fig. 4. These will be found especially useful in passing through rough water where they will relieve the axles of any thrust thrown upon the wheels by the side waves coming in contact with the sides of the wheels.

While the steering wheel or wheels of my boat may be like those of any other boat of this class, I much prefer the arrangement shown in Figs. 1, 2 and 3 in which the steering wheel is supported by an axle which in turn is journaled in a turn table and I will now describe this construction. At the rear of the deck or platform I provide a turn table 50 which is supported by an axle or shaft 51 projecting through the rudder wheel 3 before referred to and which is journaled in standards 52 projecting downwardly from the turn table. I may here mention that this rudder wheel is also provided with radial air tight compartments and is located within a housing 53 projecting upwardly from the turn table 50. The turn table itself, which it will be recalled is supported by the rudder wheel 3, supports the rear end of the platform or deck 18, the said platform or deck being provided with a set of grooved rollers 55 into which projects the flat rim 56 of the aforesaid turn table 50. It will thus be seen that these grooved rollers 55 permit the turn table to be turned with respect to the platform or deck 18 and that, inasmuch as the shaft 51 of the rudder wheel 3 is journaled in the turn table, said rudder wheel turns simultaneously with the turning of the turn table. This turn table may be rotated in any desirable way but I prefer to employ a downwardly projecting flange 60 which has lugs 61 turned upwardly therefrom so as to provide a means of supporting the rudder chain or cable 63 as indicated in Fig. 3, this chain or cable 63 passing, as indicated in Fig. 2, up to the steering wheel 65. The turn table 50 may be provided with a suitable housing 66 which projects over and surrounds the same and forms a housing which rotates therewith.

From the foregoing description and the accompanying drawings, it will be seen that I have provided a boat which may be used on land or water, and that it is of such construction as to provide the maximum of buoyancy and strength; that the weight is carried below the main or driving shafts, and the strain or leverage on the said driving shafts is reduced to a minimum.

It is obvious that changes may be made without departing from the spirit of my invention the scope of which is set forth by the appended claims.

What I claim as my invention is:

1. In a device of the character described, buoyant propellers, an axle or shaft therefor, a deck or platform carried by said axle or shaft, and bearings for said shaft carried by said deck or platform, said bearings extending within the faces of said buoyant propellers, substantially as described.

2. In a device of the character described, buoyant propellers, an axle or shaft therefor, a deck or platform carried by said axle or shaft, hubs for said buoyant propellers located slightly to one side axially of the center of said propellers, and bearings for said shaft, said bearings and said hubs being located so that the center line of said buoyant propellers is substantially between the same, whereby the strain on the axle is reduced to a minimum, substantially as described.

3. In a device of the character described, buoyant propellers, an axle or shaft therefor, a deck or platform carried by said axle or shaft, bearings for said shaft carried by said deck or platform, a bracing device also carried by said deck or platform and having an anti-friction roller coacting with said buoyant propellers to sustain side pressure, substantially as described.

4. In a device of the character described, buoyant propellers having a series of compartments, an annular web projecting from the outer wall of said compartments, and the exterior faces of the said compartments being angularly disposed, substantially as described.

5. In a device of the character described, buoyant propellers having a series of compartments, an annular web projecting from the outer wall of said compartments, the exterior faces of the said compartments being angularly disposed, and a sectional annular rim detachably connected to said web, substantially as described.

6. In a device of the character described, buoyant propellers comprising a series of radially arranged compartments forming an annular buoyant part of the propeller, the exterior walls thereof being angularly disposed, a web projecting from the exterior thereof, and spokes projecting from the interior thereof, substantially as described.

7. In a device of the character described, buoyant propellers comprising a series of radially arranged compartments forming an annular buoyant part of the propeller, the exterior walls thereof being angularly disposed, a web projecting from the exterior thereof, spokes projecting from the interior thereof, a rim secured to said web, and blades projecting radially from said web and angularly disposed walls of the compartments, substantially as described.

8. In a device of the character described, a rudder wheel, a turn table in which the axle or shaft of said rudder wheel is journaled, said turn table being over said rudder wheel and supported thereby and a platform or deck supported by said turn table, substantially as described.

9. In a device of the character described, a rudder wheel, a turn table supported thereby in which the axle or shaft of said rudder wheel is journaled, and a platform or deck supported by said turn table having a housing projecting upwardly therefrom and incasing said rudder wheel, said housing being of substantially the same shape as the upper part of the wheel and rotating with said turn table, substantially as described.

10. In a device of the character described, a rudder wheel, a turn table supported thereby and rotatable therewith, a deck or platform supported by said turn table, and grooved rollers journaled on said platform or deck and having the periphery of the turn table projecting into their grooves, substantially as described.

11. In a device of the character described, a rudder wheel, a turn table supported thereby and formed of a substantially flat circular plate having a housing projecting therefrom an incasing said rudder wheel, said turn table and said housing being rotatable together, a platform or deck, and grooved rollers carried by said platform or deck, the periphery of said substantially flat turn table entering the grooves in said rollers and being supported therein, substantially as described.

12. In a device of the character described, a rudder wheel, a turn table supported thereby and having a flange projecting therefrom, a platform or deck supported by said turn table, a steering wheel on said platform or deck, and a chain or cable passing around the flange of said turn table and leading to said steering wheel, substantially as described.

13. In a device of the character described, a rudder wheel, a turn table supported thereby and having a flange projecting therefrom, a platform or deck supported by said turn table, a steering wheel on said platform or deck, and a chain or cable passing around the flange of said turn table and leading to said steering wheel, said flange having means for holding the cable in position, substantially as described.

14. In a device of the character described, a rudder wheel, a turn table supported thereby and formed of a substantially flat circular plate having a housing projecting therefrom and incasing said rudder wheel, said turn table having a flange projecting therefrom and said table and said housing being rotatable together, a platform or deck, grooved rollers on said platform co-acting with said flat turn table, a steering wheel also on said platform or deck, and a chain or cable passing around the flange of said turn table and leading to said steering wheel, substantially as described.

Signed by me at Washington, D. C., this 17th day of December 1908.

ALBERT G. CUMMINGS.

Witnesses:
S. C. HILL,
THOS. E. ROBERTSON.